3,005,903
ARC WELDING

Harry J. Bichsel, East Aurora, and Alfred J. Baeslack, Clarence, N.Y., assignors to Westinghouse Electric Corporation, East Pittsburgh, Pa., a corporation of Pennsylvania
Filed June 6, 1957, Ser. No. 663,943
18 Claims. (Cl. 219—131)

This invention relates to the art of arc welding and has particular relationship to submerged arc welding. This invention is particularly advantageous when applied to high-speed automatic welding.

Submerged arc welding apparatus of the prior art type is relatively complex not only in its structure, but also in the interrelationship of its various components. This complexity leads to high manufacturing and maintenance cost, but what is more important, the complexity militates against uninterrupted reliable automatic welding.

It is accordingly broadly an object of this invention to provide submerged-arc welding apparatus of the relatively simple structure having a low manufacturing and maintenance cost.

Another object of this invention is to provide arc welding apparatus of the submerged arc type particularly suitable for continuous reliable high speed welding.

This invention arises from the discovery that the heart of the complexity of the prior art submerged-arc welding apparatus resides in the necessity, during the start of a welding operation or at any time after the arc is extinguished, for retracting the electrode from the work after the electrode contacts the work to fire the arc. It has also been discovered that this disability of firing an arc without retracting the electrode from the work of the prior art apparatus presents difficulties at the start of a welding operation.

It is accordingly a specific object of this invention to eliminate the necessity for retracting the electrode from the work in starting an arc with submerged-arc welding apparatus.

Another specific object of this invention is to provide a method of submerged-arc welding in the practice of which an arc shall be fired between the electrode on the work without retracting the electrode from the work.

It has been found that when potential from a constant potential supply is impressed between the electrode and the work while the electrode is in engagement with the work a high current surge is produced which tends to explode or blow out the tip of the electrode in engagement with the work and to fire an arc. With the arc energized from a constant potential supply then, the arc may be fired without retracting the electrode from the work.

In accordance with this invention in its specific aspects, a method of submerging arc welding is provided in the practice of which power is supplied from a constant potential supply to fire the arc while the electrode is engaged with the work. In accordance with a further aspect of this invention, apparatus particularly suitable for practicing the above-described method is provided.

The novel features considered characteristic of this invention are disclosed generally above. The invention itself both as to its organization and method of operation, together with additional objects and advantages thereof, will be understood from a specific description of embodiments when read in conjunction with the accompanying drawings, in which.

Figure 1:
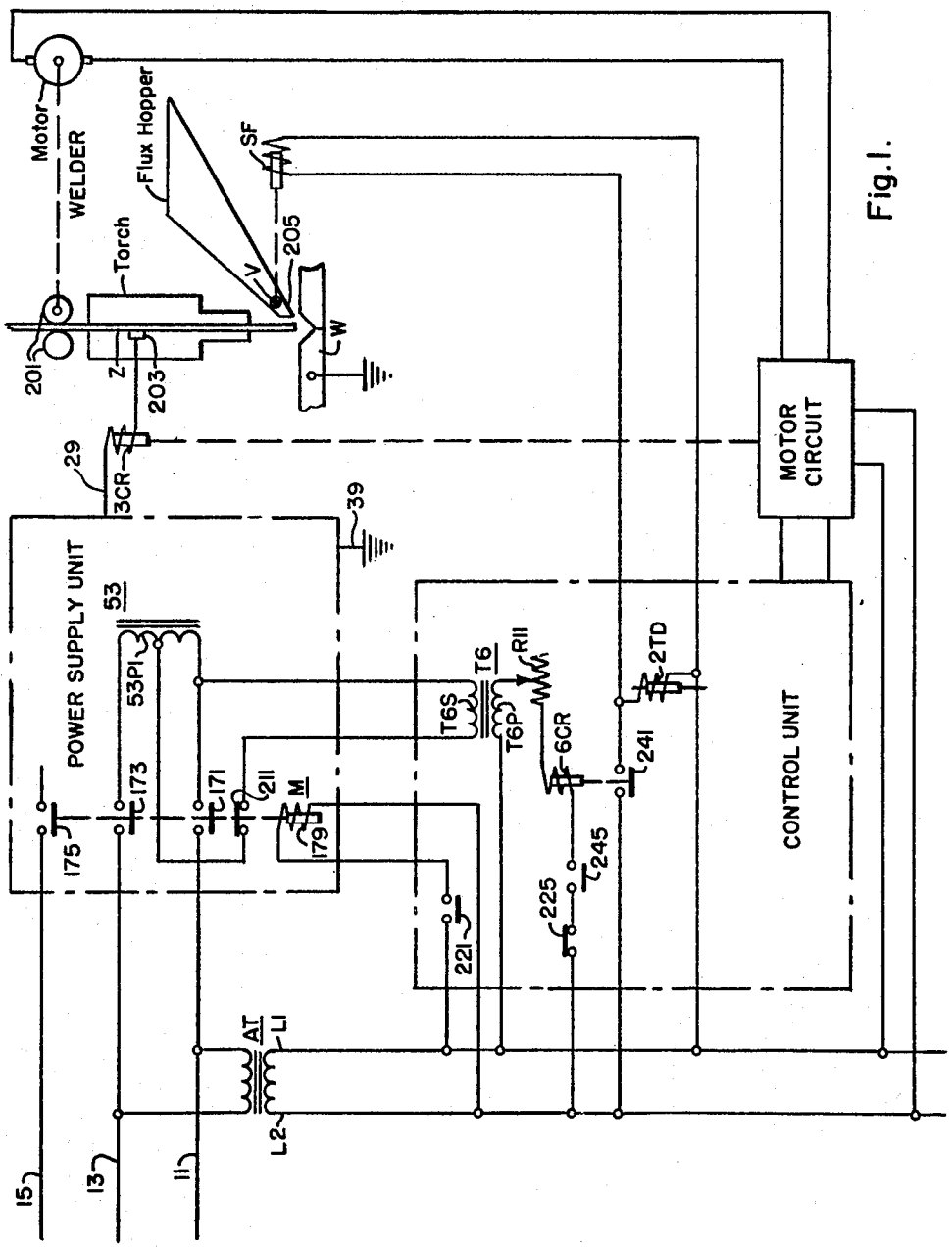
FIGURE 1 is a block diagram showing a preferred embodiment of this invention.
Figure 2:
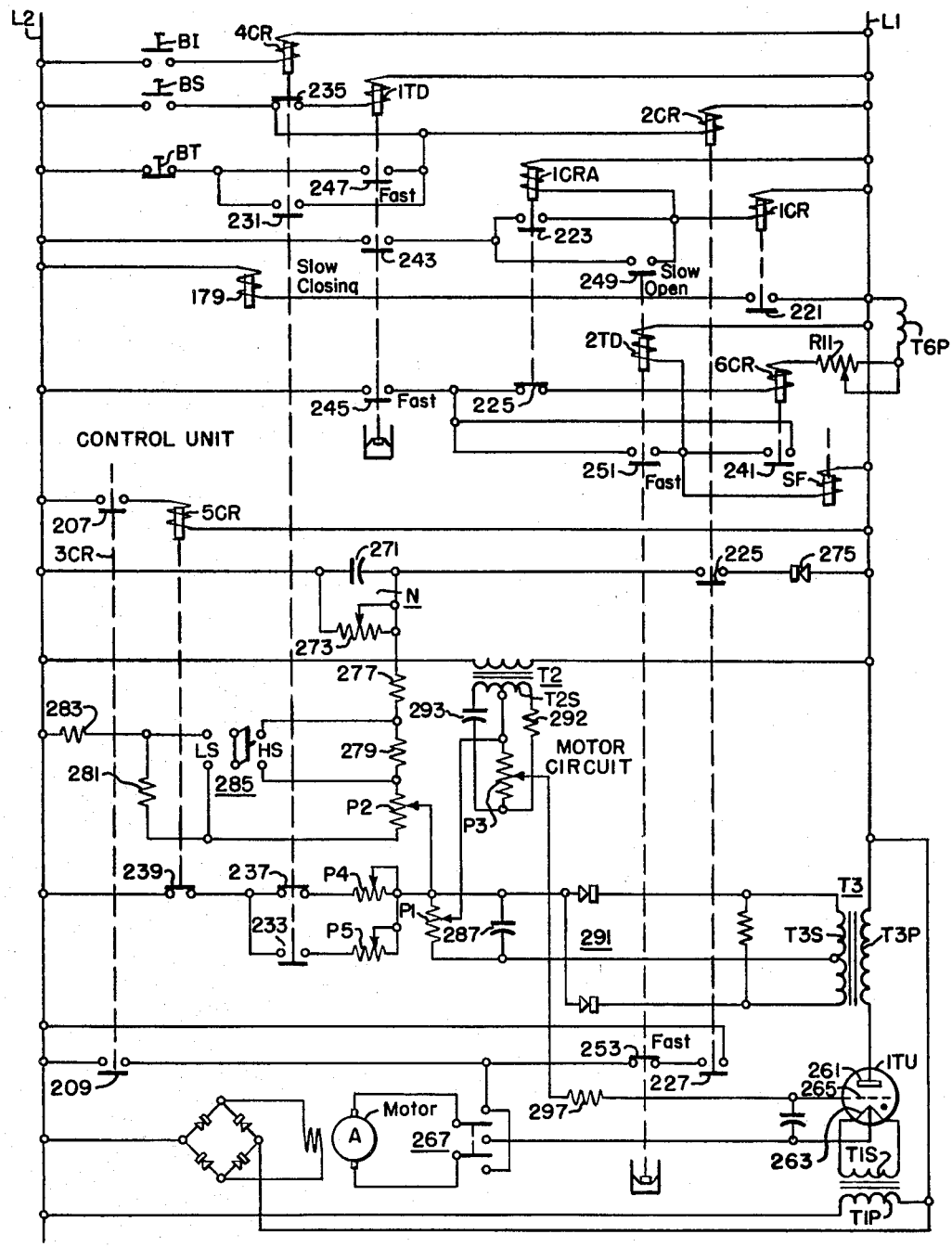
FIG. 2 is a circuit diagram of the embodiment shown in FIG. 1.

The apparatus shown in FIGS. 1 and 2 includes a Welder, a Power Supply Unit, a Control Unit and a Motor Circuit. This apparatus is energized from buses or conductors 11, 13 and 15 which may be connected to a commercial three-phase supply through the usual switches or disconnects (not shown). Power for the Control Unit and for the Motor Circuit which is usually of a lower voltage than that available between buses 11, 13 and 15 is derived from conductors L1 and L2 which are energized from an auxiliary transformer AT supplied from the buses 11 and 13.

The Welder includes a gun or torch through which an electrode Z is supplied for welding work W. The electrode Z is driven by rollers 201 which are rotated by a suitable motor supplied by the Motor Circuit. The torch includes a brush or guide tube 203 which contacts the electrode as it passes to the work. Current for the welding arc is supplied through the brush 203.

The Welder also includes a hopper through which a granular flux is supplied to the area of the weld. The delivery end 205 of the hopper is disposed adjacent to the point where the electrode Z engages the work W and is provided with an opening normally maintained closed by a valve V controlled by a solenoid SF.

The valve V blocks the flow of flux when the solenoid SF is deenergized. This solenoid is adapted to be energized from the Control Unit.

The hopper may be secured to the gun and the gun and the hopper together may be movable along the work W or the work may be movable with reference to the gun and hopper.

The Power Supply Unit is of the substantially constant potential type. Any constant potential supply unit available in the art may be used in the practice of this invention but the Supply Unit disclosed in Bichsel Patent No. 2,786,160 is to be preferred.

This Power Supply Unit is included in the apparatus shown in the drawings and for the purpose of facilitating the understanding of this invention, the several components of this unit involved in the practice of this invention are labeled in the same way as they are labeled in the Bichsel patent. Specifically, this unit includes a transformer 53 having a plurality of primaries, one of which, 53P1, is shown in FIG. 1 of this application. These primaries are adapted to be energized from the conductors 11, 13 and 15 through the contacts 171, 173, 175 of a contactor M when the solenoid 179 of this contactor is supplied with current from the conductors L1 and L2. The secondaries of the transformer 53 supply the output conductors 29 and 39 of the Power Supply Unit through a rectifier (shown in Bichsel patent). The hot conductor 29 is connected to the brush 203 of the torch through the coil of a current relay 3CR, the other conductor 39 is grounded and is thus connected to the work W which is also grounded. The current relay 3CR has a pair of normally open contacts 207 and 209 which are connected to the Motor Circuit.

A portion of the primary 53P1 is supplied from the secondary T6S of a transformer T6 in the Control Unit through normally closed contacts 211 of the contactor M. When the transformer T6 is energized, it energizes the primary 53P1 providing a small potential between the conductors 29 and 39 and thus between the electrodes Z and the work while the contactor M is deenergized.

The Control Unit includes a plurality of relays 1CR, 1CRA, 2CR, 4CR, 5CR and 6CR. These relays are instantaneously actuable both when they are energized and when they are deenergized. In addition, the Control Unit includes the time delay relays 1TD and 2TD. Further the Control Unit includes the start button BS, the stop button BT, and the inching button BI.

The relay 1CR has a normally open contact 221. The solenoid 179 is adapted to be connected between conductors L1 and L2 through the contact 221.

The relay 1CRA includes a normally open contact 223 and a normally closed contact 225. The relay 2CR includes two normally open contacts 227 and 225. The relay 4CR includes two normally open contacts 231 and 233 and two normally closed contacts 233 and 237. The relay 5CR includes a normally closed contact 239. The relay 6CR includes a normally open contact 241. The relay 1TD includes a normally open contact 243 which closes instantaneously when the relay is energized, but opens a predetermined time interval after the relay is deenergized. The relay 1TD also includes a pair of normally open contacts 245 and 247 which close instaneously on energization of the relay and open instantaneously when the relay is deenergized. The relay 2TD includes a normally open contact 249 which opens a predetermined time interval after the relay is energized, but is closed instantaneously when the relay is deenergized. The relay 2TD also includes a normally open contact 251 which closes instantaneously when the relay is energized and opens instantaneously when the relay is deenergized and a normally closed contact 253 which opens instantaneously when the relay is energized and closes instantaneously when the relay is deenergized.

The coil of relay 4CR is adapted to be connected between conductors L1 and L2 through the inching button BI.

The coil of the relay 1TD is adapted to be connected between conductors L1 and L2 through the normally open start push button BS and the normally closed contact 235 of the relay 4CR. The coil of the relay 1TD is also adapted to be connected between conductors L1 and L2 through the normally closed stop push button BT, the normally open instantaneous contacts 247 of the relay 1TD and the normally closed contact 235 of the relay 4CR.

The coil of the relay 2CR is adapted to be connected between conductors L1 and L2 through the start push button BS. This coil is also adapted to be connected between conductors L1 and L2 through the stop button BT and alternatively through the normally open instantaneous contact 247 of the relay 1TD or the normally open contact 231 of the relay 4CR.

The coil of the relay 1CR is adapted to be connected between conductors L1 and L2 through the slow opening contacts 243 of relay 1TD and alternatively through the normally open contact 223 of the relay 1CRA or the slow closing contact 249 of the relay 2TD. The coil of the relay 1CRA is adapted to be connected between conductors L1 and L2 through the slow contact 243 of relay 1TD, and the slow contact 249 of relay 2TD. This coil is adapted to be locked in between conductors L1 and L2 through the normally open slow contact 243 of relay 1TD and the normally open contact 223 of relay 1CRA.

The coil of the relay 5CR is adapted to be connected between conductors L1 and L2 through normally open contact 207 of the relay 3CR.

The coil of relay 6CR is adapted to be connected between conductors L1 and L2 through a normally open instantaneous contact 245 of relay 1TD, normally closed contact 225 of relay 1CRA, a variable resistor R11, and the primary T6P of the transformer T6. When relay 1TD is actuated, current flows to the primary T6P and through the coil of relay 6CR, but in the standby condition of the apparatus with the electrode Z separated from the work W, this current is insufficient to actuate relay 6CR. The current required to actuate relay 6CR may be set by setting resistor R11. The flux solenoid SF is adapted to be connected between conductors L1 and L2 through the normally open instantaneous contact 245 of relay 1TD and alternatively through the normally open contact 241 of relay 6CR or the normally open instantaneous contact 251 of relay 2TD.

The coil of relay 2TD is adapted to be connected between conductors L1 and L2 through the normally open instantaneous contact 245 of relay 1TD and normally open contact 241 of relay 6CR. Once relay 2TD is actuated, this coil is locked in between conductors L1 and L2 through its normally open instantaneous contact 251.

The Motor Circuit includes a thyratron 1TU having an anode 261, a cathode 263 and a control electrode 265. This circuit also includes a current transformer T3 having a primary T3P connecting the anode 261 to conductor L1, the cathode 263 is adapted to be connected to conductor L2 through a reversing switch 267, the armature A of the motor and alternatively through normally open contact 209 of the relay 3CR or through the normally closed instantaneous contact 253 of relay 2TD and a normally open contact 227 of relay 2CR.

In the control circuit of the thyratron 1TU, a composite potential is impressed. This potential includes a direct-current component derivable from a time constant network N including a capacitor 271 and a resistor 273 which may be variable. This network is adapted to be connected between conductors L1 and L2 through a rectifier 275 and normally open contact 225 of the relay 2CR. When relay 2CR is actuated, the network is charged and its potential is impressed across a divider network including a plurality of resistors 277, 279, 281, 283 and a variable resistor P2. A switch 285 is provided for shunting out one of the resistors 279 when the apparatus is set in the high-speed range and another resistor 281 when the apparatus is set in the low-speed range. The speed in any range may be set by setting the magnitude of the variable resistor P2. Another component of the potential impressed in the control circuit of the thyratron 1TU is a direct-current component derivable from the secondary T3S. This component is derived from a filter network including a capacitor 287 and a variable resistor P1 which is supplied from the secondary T3S through a full-wave rectifier 291. The variable resistor P1 of this network may be set so that the IR drop across the motor is compensated by the potential impressed from the network. The control circuit of the thyratron 1TU also includes a variable resistor P4 for setting the speed of inching when the apparatus is being used for automatic welding and another variable resistor P5 for setting the speed of inching when the apparatus is being used manually. The first variable resistor P4 is connected between the adjustable arm of the variable resistor P2 and the conductor L2 through normally closed contacts 237 and 239 of relays 4CR and 5CR. The other resistor P5 is adapted to be connected in lieu of the former resistor P4 through a normally open contact 233 of relay 4CR and the normally closed contact 239 of relay 5CR.

The control circuit of 1TU also includes an alternating-current ripple component displaced in phase with reference to the potential impressed between the conductors L1 and L2. This ripple component is derived from the secondary T2S of a transformer 2T supplied from the conductors L1 and L2. Across this secondary, a resistor 292 and a capacitor 293 are connected in series. A variable resistor P3 for deriving the phase shifted A.C. grid bias is impressed between an intermediate tap of the secondary T2S and the junction of the resistor 292 and capacitor 293.

The control circuit of thyratron 1TU is differently connected for automatic inch, manual inch and normal welding operation. During automatic inch, the relay 2CR is actuated and relays 4CR and 5CR are unactuated and the control circuit of 1TU extends from the control electrode 263 through a grid resistor 297, a portion of the variable resistor P3 across which the phase shift potential is derivable, a portion of the variable resistor P1 across which the IR drop compensating potential is derivable, the automatic inch variable resistor P4, the normally closed contacts 237 and 239 of relays 4CR and 5CR, conductor L2, now closed contact 227 of relay 2CR, normally closed instantaneous contact 253 of relay 2TD and the armature A of the motor to the cathode 263.

During manual inching, relay 4CR is actuated by the inch push button and relay 2CR is actuated while relay 5CR is unactuated. In this case, the control circuit for the thyratron 1TU extends from the control electrode 265, the grid resistor 297, the variable resistor P3, the variable resistor P1, the variable resistor P5, the now closed contact 233 of relay 4CR, the normally closed contact 239 of relay 5CR, the now closed contact 227 of relay 2CR, the normally closed instantaneous contact 253 of relay 2TD, the armature A to the cathode 263. When the apparatus is set for normal welding operation, relays 5CR and 2CR are actuated and the control circuit of the motor includes the grid resistor 297, variable resistor P3, variable resistor P1, variable resistor P2, the resistors 283 and/or 281 connected to P2, the conductor L2, the now closed contact 209 of relay 3CR, the switch 267, armature A to the cathode 263.

In the standby condition of the apparatus, the electrode is threaded in the torch and the disconnects (not shown) between the supply and conductors 11, 13 and 15 are closed. Transformer AT is then energized energizing conductors L1 and L2. At this point, the start switch is open so that relays 1TD and 2CR are unactuated. Relays 1CR and 1CRA are then unactuated. Since 1CR is unactuated, contactor M is deenergized and conductors 29 and 39 are deenergized. Relay 3CR is unactuated and relay 5CR is unactuated. Since relay 1TD is unactuated, relays 6CR and 2TD are unactuated and the flux solenoid SF is deenergized maintaining the hopper closed. Since relay 2CR is deenergized, the biasing network N is deenergized. In addition, since relays 2CR and 3CR are deenergized, the Motor Circuit is open.

It is believed to be unnecessary to describe the operation of the apparatus when it is being manually inched. The apparatus will then only be described in automatic operation. In automatic operation, the torch and the hopper are set at the point where the welding is to start. It may be assumed that the work is to be disposed on a movable table which is to be moved by a motor so that the work passes under the electrode and the hopper. The control for the table motor does not concern this invention.

To start a welding operation, the start switch BS is closed. Relays 1TD and 2CR are then actuated. At one of the instantaneous contacts 247 of relay 1TD, both relays 1TD and 2CR are locked in through the stop push button BT. At another instantaneous contact 245 of relay 1TD, the circuit through the coil of relay 6CR, the resistor R11 and the primary T6P is closed. A small potential is supplied between the electrode Z and the work W through T6S and 53P1 (FIG. 1). Since the electrode is at this time disengaged from the work, the current flow through the coil of relay 6CR is insufficient to actuate this relay. The slow contact 243 of relay 1TD is also closed, but this has no effect at this time because of open contacts 223 and 249 of relays 1CRA and 2TD.

Since relay 2CR is actuated, its normally open contact 225 in series with the biasing network N is closed and the biasing network is immediately charged. In addition, at the other now closed contact 227 of relay 2CR, the Motor Circuit is completed and the motor is energized so that it rotates at the low speed determined by the setting of the variable resistor P4.

The electrode Z is then advanced towards the work W at a low speed. When the electrode contacts the work, the resistance in the secondary T6S of transformer T6 is reduced to a substantial extent and the current flowing through the coil of relay 6CR is increased so that this relay is actuated. At now closed contact 241 of relay 6CR, a circuit is completed through the flux solenoid SF and valve V is now energized to permit granular flux to be supplied to cover the tip of the electrode A and the work in the region where the weld is to start. In addition, relay 2TD is energized and is locked in through its normally open instantaneous contact 251. The normally closed instantaneous contact 253 of the relay 2TD is now opened opening the Motor Circuit so that the electrode Z remains in contact with the work W. The normally open slow contact 249 of the relay 2TD remains open for a predetermined time interval which is sufficient to permit adequate flux to be supplied over the tip of the electrode Z and the work. When adequate flux has been supplied, the normally open slow contact 249 closes, energizing relays 1CR and 1CRA. These relays are locked in through the now closed contact 223 of relay 1CRA.

The actuation of relay 1CR causes the contactor M to be energized. The transformer 53 is now energized from the conductors 11, 13, and 15, supplying the welding power to the leads 29 and 39. In addition, the normally closed contact 211 (FIG. 1) of the contactor M is open, disconnecting the primary 53P1 from the transformer T6. Current now flows through the electrode Z and the work and because the Power Supply Unit is of the constant-potential type, a high surge of current is produced to explode the tip of the electrode under the flux and fire the arc.

The flow of current through the conductors 29 and 39 and the arc actuates the relay 3CR and at one of the now closed contacts 209 of this relay, the Motor Circuit is again completed and the feeding of the electrode is started. In addition, relay 5CR is actuated by the closing of another normally open contact 207 of relay 3CR, opening the connection between the variable resistor P4 and the conductor L2. The speed of the motor is now controlled from the variable resistor P2 and this resistor is set for normal running operation and may be relatively high. The relay 5CR or other related relays may have another contact (not shown) which actuates the work table motor so that the work is moved under the arc as the weld progresses.

The normally closed contact 225 of relays 1CRA is now open so that the circuit through the coil of relay 6CR is maintained open. Relay 2TD remains energized through its now closed instantaneous contact 251.

The welding now progresses until the weld is completed. At this point, the stop button BT is opened. This deenergizes relays 1TD and 2CR. The instantaneous contact 247 of relay 1TD now opens assuring that the circuits through the coil of relays 1TD and 2CR remain open regardless of whether the stop button is reclosed. The slow contact 243 of relay 1TD remains closed. The relays 1CR and 1CRA then remain actuated and contactor M remains actuated, but the supply of charging current to the biasing network N is interrupted so that the charge on this network decays. The decay of this charge reduces the speed at which the motor is rotated. The electrode Z is then supplied at a lower and lower speed and the current tapers off as predetermined by the setting of resistor 273 and eventually the arc is interrupted. The tapering off of the current eliminates any tendency to produce a crater.

The slow contact 243 of the relay 1TD remains closed until the arc has been interrupted. Once it opens, relays 1CR and 1CRA are deenergized. In addition, the interruption of the current deenergizes relay 3CR which causes relay 5CR to be deenergized and opens and resets the Motor Circuit. The apparatus is now reset in standby condition.

Figure 3:
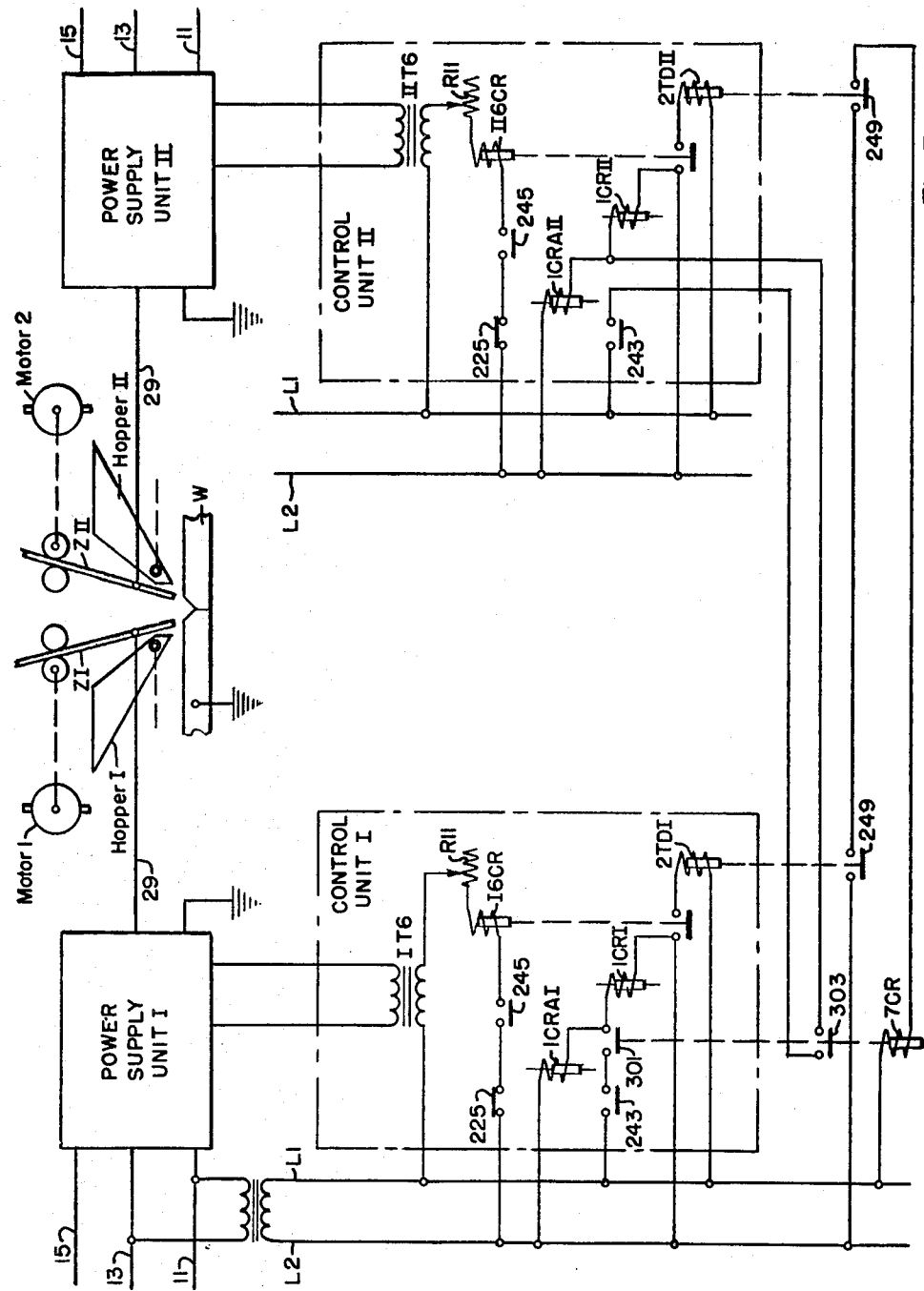
FIG. 3 is a diagrammatic view showing a modification of this invention.

The modification shown in FIG. 3 relates to apparatus in which the work W is welded by a plurality of electrodes ZI and ZII. The apparatus shown in FIG. 3 includes only two electrodes, but the invention disclosed in FIG. 3 is applicable to any number of electrodes. The electrodes ZI and ZII are supplied from separated power supply units labelled I and II and controlled from separate control units labelled I and II. The electrodes ZI and ZII are driven from separate motors controlled from separate motor circuits.

The Control Units I and II, Power Supply Units I and

II and motor circuits of the apparatus shown in FIG. 3 are similar to those of FIGS. 1 and 2 except that the apparatus of FIG. 3 includes in addition to the separate units and circuits a relay 7CR which may be mounted on one of the control units for example, Control Unit I. The coil of relay 7CR is adapted to be connected between conductors L1 and L2 through the slow contacts 249 or relays 2TDI and 2TDII of the Control Units I and II. All contacts 249 must be closed to actuate 7CR. Relay 7CR has a plurality of contacts 301 and 303. Contact 301 is connected in series with slow contact 243 of relay 1TD of Control Unit I and the coils 1CRI and 1CRAI between conductors L1 and L2. Contact 303 is similarly connected in series with slow contact 243 of relay 1TD of Control Unit II and coils 1CRII and 1CRAII of Control Unit II between conductors L1 and L2. The contacts 301 and 303 are thus connected to control relays 1CRI, 1CRII, 1CRAI, 1CRAII in lieu of the slow contacts 249 which are now connected to control 7CR. Thus when relay 7CR is actuated, relays 1CRI, 1CRII, 1CRAI, 1CRAII are actuated. Relays 1CRI and 1CRAI and 1CRII and 1CRAII are connected to control Power Supply Units I and II respectively and the associated motor circuits in the same manner as relays 1CR and 1CRA control the Power Supply Unit and Motor Circuit in FIGS. 1 and 2. When relays 1CRI, 1CRII, ICRAI, and ICRAII are actuated, a welding operation is carried out. The supply of flux in each coil and the other steps of the application are also controlled by Control Units I and II (for example their relays 6CRI and 6CRII) in the same manner as their steps are controlled by Control Unit of the apparatus shown in FIGS. 1 and 2. Thus, the effect of the relay 7CR is to assure that a welding operation will be carried out only if all electrodes ZI and ZII are in contact with the work W.

The invention disclosed herein is both a new method of submerged-arc welding and new welding apparatus of the submerged arc type. The method may be practiced with apparatus of relatively simple structure compared to the prior art apparatus which does not include facilities for withdrawing the electrode from the work to fire the arc after the electrode is engaged with the work. The apparatus which embodies this invention is particularly suitable for practicing the method. The practice of the method and the use of the apparatus in accordance with this invention has led to highly successful automatic welding in which the arc has been maintained continuously throughout each welding operation and sound welds have been produced. Automatic welding in accordance with this invention has been carried out with electrodes, particularly mild steel electrodes varying in diameter over a wide range. Successful welding has been carried out with an electrode having a diameter of 3/32 of an inch and with the arc current 500 amperes.

While preferred embodiments of this invention have been disclosed herein, many modifications thereof are feasible. This invention is not to be restricted except insofar as is necessitated by the spirit of the prior art.

We claim as our invention:

1. The method of welding work with a consumable electrode in a flux-submerged arc and with a substantially constant potential power supply, said supply being normally deenergized; the said method comprising advancing said electrode into contact with said work, after said electrode contacts said work depositing said flux, and after said flux has been deposited energizing said power supply while said electrode is in contact with said work to fire an arc between said electrode and said work to produce a weld.

2. The method of welding work with a consumable electrode in a flux-submerged arc and with a substantially constant potential power supply, said supply being normally deenergized; the said method comprising advancing said electrode into contact with said work, stopping the advancing of said electrode after said electrode contacts said work so that said electrode remains in contact with said work, after said electrode contacts said work depositing said flux, and after said flux has been deposited energizing said power supply while said electrode is in contact with said work to fire an arc between said electrode and said work to produce a weld.

3. Apparatus for welding work with an arc submerged in flux between an electrode and said work comprising in combination welding power supply means of the substantially constant potential type, said power supply means being deenergized in the standby condition of said apparatus, means connecting said power supply means between said electrode and said work whereby when said power supply means is energized power for striking and maintaining an arc is impressed between said electrode and said work, means to be connected to said electrode to be actuated for advancing said electrode toward said work so that said electrode engages said work, first means actuable responsive to the engagement of said electrode and said work permitting the deposit of flux between said electrode and said work, second means actuable responsive to said engagement of said electrode and said work and connected to said advancing means for interrupting the actuation of said advancing means to stop said electrode in engagement with said work, third means actuable responsive to said engagement of said electrode and said work connected to said power supply means for energizing said power supply means to strike an arc between said electrode and said work while said electrode is stopped in engagement with said work, and means responsive to said arc between said electrode and connected to said electrode advancing means for again actuating said advancing means.

4. The method of welding work with a consumable electrode in a flux-submerged arc and with a substantially constant potential power supply, said supply being normally deenergized; the said method comprising advancing said electrode into contact with said work, after said electrode contacts said work depositing said flux, after said flux has been deposited energizing said power supply while said electrode is in contact with said work to fire an arc between said electrode and said work to produce a weld, and after said weld has been produced reducing the speed at which said electrode is advanced towards the work at a predetermined rate while maintaining said supply energized until said arc is extinguished.

5. The method of welding work with a consumable electrode in a flux-submerged arc and with a substantially constant potential power supply, said supply being normally deenergized; the said method comprising advancing said electrode into contact with said work, stopping the advancing of said electrode after said electrode contacts said work so that said electrode remains in contact with said work, after said electrode contacts said work depositing said flux, after said flux has been deposited energizing said power supply while said electrode is in contact with said work to fire an arc between said electrode and said work to produce a weld, and after said weld has been produced reducing the speed at which said electrode is advanced towards the work at a predetermined rate while maintaining said supply energized until said arc is extinguished.

6. Apparatus for welding work with an arc submerged in flux between an electrode and said work, said flux being supplied by flux supply means including valve means blocking the supply of said flux in the standby condition of said apparatus, comprising in combination welding power supply means of the substantially constant potential type, said power supply means being deenergized in the standby condition of said apparatus, means connecting said power supply means between said electrode and said work whereby when said power supply means is energized power for striking and maintaining an arc is impressed between said electrode and said work, means to be connected to said electrode to be actuated for advancing said electrode toward said work so that said electrode engages said work, first means connected to said valve means and actuable responsive to the engagement of said electrode and said work to actuate said valve means to permit the deposit of flux between said electrode and said work, second means actuable responsive to said engagement of said electrode and said work and connected to said advancing means for interrupting the actuation of said advancing means to stop said electrode in engagement with said work, third means actuable responsive to said engagement of said electrode and said work connected to said power supply means for energizing said power supply means to strike an arc between said electrode and said work while said electrode is stopped in engagement with said work, and means responsive to said arc between said electrode and said work and connected to said electrode advancing means for again actuating said advancing means.

7. Apparatus for welding work with an arc submerged in flux supplied between an electrode and said work by flux-supply means comprising in combination welding power supply means of the substantially constant potential type, said power supply means being deenergized in the standby condition of said apparatus, means connecting said power supply means between said electrode and said work whereby when said power supply means is energized power for striking and maintaining an arc is impressed between said electrode and said work, means to be connected to said electrode to be actuated for advancing said electrode toward said work so that said electrode engages said work, means responsive to the engagement of said electrode and said work to be connected to said flux supply means and connected to said power supply means and said advancing means for interrupting the actuation of said advancing means when said electrode is in engagement with said work, for permitting the deposit of flux on said electrode and work and after said flux is deposited for energizing said power supply means to strike an arc between said electrode and said work while said electrode is stopped in engagement with said work, and means responsive to said arc between said electrode and said work and connected to said electrode advancing means for again actuating said advancing means.

8. Apparatus for welding work with an arc submerged in flux supplied by flux supply means between an electrode and said work comprising in combination welding power supply means of the substantially constant potential type, said power supply means being deenergized in the standby condition of said apparatus, means connecting said power supply means between said electrode and said work whereby when said power supply means is energized power for striking and maintaining an arc is impressed between said electrode and said work, means to be connected to said electrode to be actuated for advancing said electrode toward said work so that said electrode engages said work, and means responsive to the engagement of said electrode and said work to be connected to said flux supply means and connected to said power supply means and said advancing means, for permitting the deposit of flux on said electrode and work and after said flux is deposited for energizing said power supply means to strike an arc between said electrode and said work while said electrode is stopped in engagement with said work.

9. Apparatus for welding work with an arc submerged in flux supplied by flux supply means between an electrode and said work comprising in combination welding power supply means of the substantially constant potential type, said power supply means being deenergized in the standby condition of said apparatus, means connecting said power supply means between said electrode and said work whereby when said power supply means is energized power for striking and maintaining an arc is impressed between said electrode and said work, means to be connected to said electrode to be actuated for advancing said electrode toward said work so that said electrode engages said work, means responsive to the engagement of said electrode and said work to be connected to said flux supply means and connected to said power supply means and said advancing means for interrupting the actuation of said advancing means when said electrode is in engagement with said work, for permitting the deposit of flux on said electrode and work and after said flux is deposited for energizing said power supply means to strike an arc between said electrode and said work while said electrode is stopped in engagement with said work, and means responsive to the current of said arc between said electrode and connected to said electrode advancing means for again actuating said advancing means.

10. Apparatus for supplying power from a source for arc-welding work with an electrode comprising in combination a power supply unit having output conductors adapted to be connected between said electrode and said work, normally open switch means connected to said unit for maintaining said unit disconnected from said source in the standby condition of said apparatus, winding means connected to said unit to be connected to said source for impressing a potential between said conductors while said switch means is open, said potential being low compared to the potential impressed between said conductors when said switch means is closed, means for advancing said electrode to said work while said switch means is open, and means responsive to the reduction in the reactance of said winding means reflected through said unit when said electrode engages said work for closing said switch means.

11. Apparatus for supplying power from a source for arc-welding work with an electrode comprising in combination a power supply unit having output conductors adapted to be connected between said electrode and said work, normally-open switch means connected to said unit for maintaining said unit disconnected from said source in the standby condition of said apparatus, winding means connected to said unit to be connected to said source for impressing a potential between said conductors while said switch means is open, said potential being low compared to the potential impressed between said conductors when said switch means is closed, means for advancing said electrode to said work while said switch means is open, and means responsive to the reduction in the reactance of said winding means reflected through said unit when said electrode engages said work for interrupting the advancing of said electrode towards said work and a predetermined time interval after the advancing by said electrode has stopped closing said switch means.

12. Apparatus for supplying power from a source for arc-welding work with an electrode comprising in combination a power supply unit having output conductors adapted to be connected between said electrode and said work, normally-open switch means connected to said unit for maintaining said unit disconnected from said source in the standby condition of said apparatus, winding means connected to said unit to be connected to said source for impressing a potential between said conductors while said switch means is open, said potential being low compared to the potential impressed between said conductors when said switch means is closed, means for advancing said electrode to said work while said switch means is open, and means responsive to the reduction in the reactance of said winding means reflected through said unit when said electrode engages said work for closing said switch means, said winding means including a primary and a secondary, said responsive means including relay means and variable means, said primary to be connected to said source through said relay means and said impedance means, said secondary being connected to said unit and said impedance means being set so that said relay means is unactuated when said electrode is disengaged from said work and is actuated when said electrode engages said work.

13. Apparatus for supplying power from a source for arc-welding work with a plurality of electrodes comprising in combination a power supply unit for each electrode, each unit having output conductors adapted to be connected between the associated electrode and said work, normally open switch means connected to each said unit for maintaining said unit disconnected from said source in the standby condition of said apparatus, winding means connected to each said unit to be connected to said source for impressing a potential between said conductors while said switch means is open, said potential being low compared to the potential impressed between said conductors when said switch means is closed, means for advancing each of said electrodes to said work while the associated switch means is open, and means responsive to the reduction in the reactances of said winding means reflected through said units when all said electrodes engage said work for closing said switch means.

14. Apparatus for supplying power from a source for arc-welding work with a plurality of electrodes comprising in combination a power supply unit for each electrode having output conductors adapted to be connected between the associated electrode and said work, normally open switch means connected to each said unit for maintaining the associated unit disconnected from said source in the standby condition of said apparatus, winding means connected to each said unit to be connected to said source for impressing a potential between said conductors of the associated unit while the associated switch means is open, said potential being low compared to the potential impressed between said conductors when said associated switch means is closed, means for advancing each said electrode to said work while the associated switch means is open, and means responsive to the reduction in the reactance of all said winding means when all said electrodes engage said work for closing the switch means of all said units, said switch means for any one of said units being closed only when all said electrodes are engaged with said work.

15. The method of welding work with a consumable electrode in a flux-submerged arc and with a substantially constant-potential power supply, said supply being normally deenergized; the said method comprising advancing said electrode into contact with said work, and depositing said flux on said work around the tip of said electrode, and, after said electrode engages said work and its tip in engagement with said work is submerged in said flux, energizing said power supply while said electrode is in contact with said work to fire an arc between said electrode and said work to produce a weld.

16. Apparatus for welding work with an arc submerged in flux between an electrode and said work comprising in combination welding power supply means of the substantially constant potential type, said power supply means being deenergized in the standby condition of said apparatus, means connecting said power supply means between said electrode and said work whereby when said power supply means is energized power for striking and maintaining an arc is impressed between said electrode and said work, means to be connected to said electrode to be actuated for advancing said electrode toward said work so that said electrode engages said work and for depositing flux around the tip of said electrode in engagement with said work, first means actuable responsive to said engagement of said electrode and said work and connected to said advancing means for interrupting the actuation of said advancing means to stop said electrode in engagement with said work, second means actuable responsive to said engagement of said electrode and said work connected to said power supply means for energizing said power supply means to strike an arc between said electrode and said work while said electrode is stopped in engagement with said work, and means responsive to said arc between said electrode and said work and connected to said electrode advancing means for again actuating said advancing means.

17. The method of welding work with a consumable electrode in a flux-submerged arc and with a substantially constant potential power supply, said supply being normally deenergized; the said method comprising advancing said electrode into contact with said work and depositing said flux on said work around the tip of said electrode, after said electrode engages said work and its tip in engagement with said work is submerged in said flux, energizing said power supply while said electrode is in contact with said work to fire an arc between said electrode and said work to produce a weld, and, after said weld has been produced, reducing the speed at which said electrode is advanced towards the work at a predetermined rate while maintaining said supply energized until said arc is extinguished.

18. The method of welding work with a consumable electrode in a flux-submerged arc and with a substantially constant-potential power supply, said supply being normally deenergized; the said method comprising advancing said electrode into contact with said work at an inching speed substantially lower than welding speed, and depositing said flux on said work around the tip of said electrode, after said electrode engages said work and its tip in engagement with said work is submerged in said flux, energizing said power supply while said electrode is in contact with said work to fire an arc between said electrode and said work to produce a weld, and after said arc is fired advancing said electrode at welding speed.

References Cited in the file of this patent

UNITED STATES PATENTS

| | | |
|---|---|---|
| 2,043,960 | Jones et al. | June 9, 1936 |
| 2,340,093 | White | Jan. 25, 1944 |
| 2,444,834 | Landis et al. | July 6, 1948 |
| 2,573,901 | Girard et al. | Nov. 6, 1951 |
| 2,634,355 | Girard et al. | Apr. 7, 1953 |
| 2,691,715 | Flora | Oct. 12, 1954 |
| 2,719,209 | Rebuffoni | Sept. 27, 1955 |
| 2,752,469 | Price | June 26, 1956 |
| 2,766,361 | Landis et al. | Oct. 9, 1956 |
| 2,769,118 | Lester | Oct. 30, 1956 |
| 2,800,571 | Glenn et al. | July 23, 1957 |
| 2,806,127 | Hackman et al. | Sept. 10, 1957 |
| 2,823,331 | Bichsel et al. | Feb. 11, 1958 |
| 2,866,808 | Gamberg et al. | Dec. 23, 1958 |